US010897498B1

(12) United States Patent
Paczkowski et al.

(10) Patent No.: US 10,897,498 B1
(45) Date of Patent: Jan. 19, 2021

(54) DISTRIBUTED LEDGER TECHNOLOGY (DLT) CONTROL OVER WIRELESS DATA RELAYS THAT SERVE USER EQUIPMENT (UE)

(71) Applicant: Sprint Communications Company L.P., Overland Park, KS (US)

(72) Inventors: Lyle Walter Paczkowski, Mission Hills, KS (US); Michael David Svoren, Jr., Overland Park, KS (US); David A. Hufker, Shawnee, KS (US); George Jason Schnellbacher, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 122 days.

(21) Appl. No.: 16/260,955

(22) Filed: Jan. 29, 2019

(51) Int. Cl.
*H04H 20/71* (2008.01)
*H04L 29/08* (2006.01)
*H04L 9/06* (2006.01)
*H04W 28/02* (2009.01)
*H04W 12/00* (2009.01)
*H04W 88/04* (2009.01)
*H04W 92/18* (2009.01)

(52) U.S. Cl.
CPC ........ *H04L 67/1074* (2013.01); *H04L 9/0618* (2013.01); *H04W 12/001* (2019.01); *H04W 12/00305* (2019.01); *H04W 28/0268* (2013.01); *H04W 88/04* (2013.01); *H04L 2209/38* (2013.01); *H04W 92/18* (2013.01)

(58) Field of Classification Search
CPC ........ H04W 4/06; H04W 84/18; H04W 84/12
See application file for complete search history.

(56) References Cited

U.S. PATENT DOCUMENTS

| 8,726,379 | B1 | 5/2014 | Stiansen et al. |
| 9,014,661 | B2 | 4/2015 | deCharms |
| 10,305,914 | B1* | 5/2019 | Brin .................... H04L 63/0428 |
| 2016/0012424 | A1 | 1/2016 | Simon et al. |
| 2017/0103468 | A1 | 4/2017 | Orsini et al. |
| 2017/0243212 | A1 | 8/2017 | Castinado et al. |
| 2018/0101842 | A1 | 4/2018 | Ventura et al. |
| 2018/0232693 | A1 | 8/2018 | Gillen et al. |
| 2018/0295546 | A1 | 10/2018 | Crawford |

(Continued)

FOREIGN PATENT DOCUMENTS

CN 101919303 B 12/2010

*Primary Examiner* — Siren Wei

(57) ABSTRACT

A wireless communication system serves wireless data services to User Equipment (UEs). In the wireless communication system, wireless data relays wirelessly transfer service information over access data networks to Distributed Ledger Technology (DLT) nodes. The DLT nodes receive the service information over the access data networks from the wireless data relays. The DLT nodes execute DLT transactions with the service data to generate service instructions. The DLT nodes transfer the service instructions over the access data networks to the wireless data relays. The wireless data relays wirelessly receive the service instructions over the access data networks from the DLT nodes. The wireless data relays wirelessly exchange user data between the UEs and the access data networks to deliver the wireless data services responsive to the service instructions from the DLT nodes.

18 Claims, 7 Drawing Sheets

(56) References Cited

U.S. PATENT DOCUMENTS

| | | | |
|---|---|---|---|
| 2019/0036711 A1* | 1/2019 | Qiu | H04L 63/0823 |
| 2019/0036906 A1* | 1/2019 | Biyani | H04L 9/3236 |
| 2019/0140848 A1* | 5/2019 | Dontov | H04L 9/006 |
| 2019/0180862 A1* | 6/2019 | Wisser | G16H 80/00 |
| 2019/0349261 A1* | 11/2019 | Smith | H04L 67/1046 |

* cited by examiner

US 10,897,498 B1

DISTRIBUTED LEDGER TECHNOLOGY (DLT) CONTROL OVER WIRELESS DATA RELAYS THAT SERVE USER EQUIPMENT (UE)

TECHNICAL BACKGROUND

Wireless communication networks serve wireless User Equipment (UE) with mobile data services like voice calling and internet access. The wireless data networks have wireless access points that exchange data signals over the air with the wireless UEs. The wireless access points exchange this data with wireless network cores. The wireless network cores exchange the data with various other systems like the internet. The wireless network cores also process user information like phone numbers and account numbers to control the Quality-of-Service (QoS) levels for the UEs. The QoS levels have various parameters for data throughput, data latency, error rates, service reliability, and other communication metrics. Popular forms of wireless networking are Fifth Generation New Radio (5GNR) and Long Term Evolution (LTE).

Wireless communication networks are deploying wireless data relays to extend the reach of their wireless data services. The wireless data relays have internal wireless access points that serve the wireless UEs. The wireless data relays also have internal relay equipment that wirelessly attaches to wireless access points in the wireless communication network. Thus, the UEs communicate with the wireless communication networks over the wireless data relays.

Distributed Ledger Technology (DLT) comprises a computer network of DLT nodes. The DLT nodes each maintain a copy of DLT data in a blockchain database format. The blockchain database format stores a hash of the previous block in the current block. The hashes and the number of DLT nodes make the DLT data immutable. The DLT nodes have endorser nodes that receive proposed DLT transactions. The DLT endorser nodes perform test DLT transactions and may endorse the test transactions per DLT endorsement rules. DLT orderer nodes distribute endorsed DLT transactions to peer nodes per orderer rules. The peer DLT nodes process chain code to execute the endorsed DLT transactions. The peer DLT nodes may reach a consensus on the executed DLT transactions, and when peer consensus is formed, the peer DLT nodes commit the DLT transaction to the immutable blockchain database and transfer the chain code output data.

Wireless communication networks may use DLT nodes to store user data in blockchain formats. Unfortunately, the DLT nodes do not effectively and efficiently control wireless data services for the users. Moreover, the DLT nodes do not support the wireless data relays that deliver the wireless data services to the wireless UEs.

TECHNICAL OVERVIEW

A wireless communication system serves wireless data services to User Equipment (UEs). In the wireless communication system, wireless data relays wirelessly transfer service information over access data networks to Distributed Ledger Technology (DLT) nodes. The DLT nodes receive the service information over the access data networks from the wireless data relays. The DLT nodes execute DLT transactions with the service data to generate service instructions. The DLT nodes transfer the service instructions over the access data networks to the wireless data relays. The wireless data relays receive the service instructions over the access data networks from the DLT nodes. The wireless data relays wirelessly exchange user data between the UEs and the access data networks to deliver the wireless data services responsive to the service instructions from the DLT nodes.

DETAILED DESCRIPTION

Figure 1:
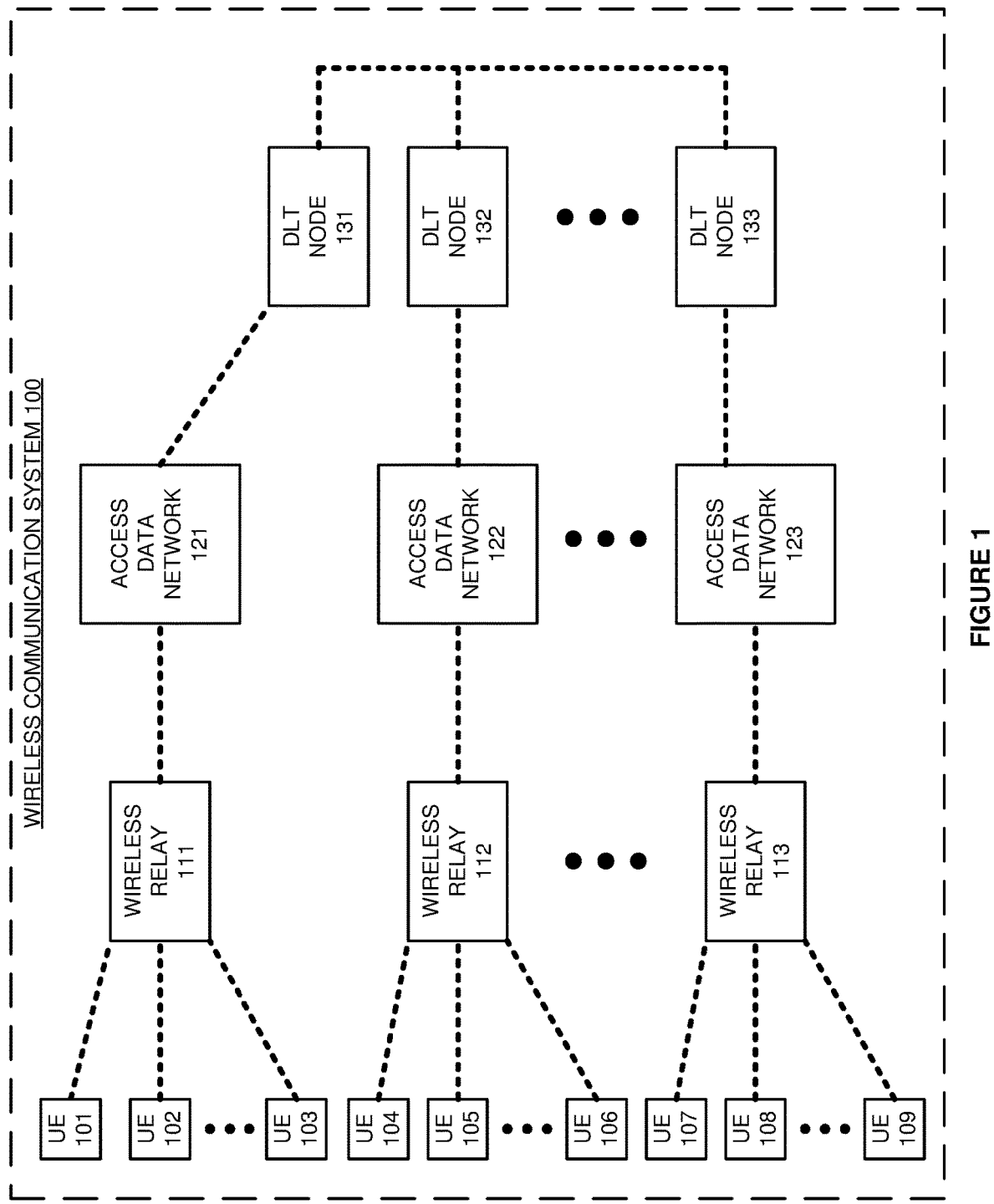
FIG. 1 illustrates a wireless communication system that comprises Digital Ledger Technology (DLT) nodes to control wireless data relays that serve wireless data services to User Equipment (UEs).

FIG. 1 illustrates wireless communication system 100 that comprises Digital Ledger Technology (DLT) nodes 131-133 to control wireless data relays 111-113 that serve wireless data services to User Equipment (UEs) 101-109. The wireless data services include internet access, voice/video calling, messaging and data transfers, machine-to-machine communications, business transactions, and/or some other over-the-air data service. Wireless communication system 100 comprises UEs 101-109, wireless data relays 111-113, access data networks 121-123, and DLT nodes 131-133. In some examples, one or more access data networks 121-123 host one or more of DLT nodes 131-133. Note that the number of UEs, relays, networks, and nodes that are depicted on FIG. 1 has been restricted for clarity. Wireless communication system 100 may be much larger.

UEs 101-109 could be computers, phones, displays, headsets, or some other user apparatus with wireless communication circuitry. UEs 101-109 wirelessly attach to wireless data relays 111-113 over Long Term Evolution (LTE), Fifth Generation New Radio (5GNR), Institute of Electrical and Electronic Engineers 802.11 (WIFI), and/or some other wireless networking protocol. UEs 101-109 each comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems, user applications, and network applications that are stored in the memory circuitry.

Wireless data relays 111-113 use LTE, 5GNR, WIFI, or some other wireless network protocol. In response to the UE attachments, wireless data relays 111-113 wirelessly transfer service information over access data networks 121-123 to DLT nodes 131-133. The service information may comprise: user identity codes, UE identity codes, Uniform Resource Indicators (URIs), user application identifiers, relay Hardware Trust (HWT) digital certificates, UE HWT digital certificates, relay voice service loading, relay video service loading, Device-to-Device (D2D) data, emergency information, and/or some other data.

Wireless data relays 111-113 wirelessly receive service instructions from DLT nodes 131-133 over access data networks 121-123. In response, wireless data relays 111-113 wirelessly exchange user data between UEs 101-109 and access data networks 121-123 to deliver the wireless data services responsive to the service instructions from DLT nodes 131-133. Wireless data relays 111-113 may deliver QoS to UEs, request QoS from access networks, establish HWT with UEs and access networks, control wireless D2D communications between UEs, handle emergency communications, or perform some other networking task. Wireless data relays 111-113 comprise radio circuitry and baseband circuitry. The radio circuitry comprises antennas, modulators, amplifiers, filters, digital/analog interfaces, processing circuitry, memory circuitry, firmware/software, and bus circuitry. The baseband circuitry comprises processing circuitry, memory circuitry, bus circuitry, and software. In the baseband circuitry, the processing circuitry executes operating systems and network applications that are stored in the memory circuitry. The baseband circuitry may also include network transceiver for IEEE 802.3 (Ethernet), Internet Protocol (IP), or some other data communication protocol.

Access data networks 121-123 comprise wireless access points like LTE eNodeBs, 5GNR gNodeBs, WIFI access points, and/or the like. Access data networks 121-123 comprise fronthaul and backhaul circuitry like Time Division Multiplexing (TDM), Ethernet, IP, Data Over Cable System Interface Specification (DOCSIS), Wave Division Multiplexing (WDM), LTE, 5GNR, WIFI, and/or the like. Access data networks 121-123 comprise core network elements like IP router, Ethernet switch, Secure Gateway (Se-GW), Relay Gateway (R-GW), Mobility Management Entity (MME), Home Subscriber System (HSS), Serving Gateway (S-GW), Packet Data Network Gateway (P-GW), Policy Control Rules Function (PCRF), Internet Protocol Multimedia Subsystem (IMS) servers, Access and Mobility Management Function (AMF), Authentication Server Function (AUSF), Unified Data Management (UDM), Session Management Function (SMF), User Plane Function (UPF), Policy Control Function (PCF), Application Function (AF), Network Repository Function (NRF), Network Slice Selection Function (NSSF), Network Exposure Function (NEF), and typically other network functions.

DLT nodes 131-133 receive service information from wireless data relays 111-113 over access data networks 121-123. DLT nodes 131-133 execute DLT transactions with the service data to generate service instructions. The service instructions may include: UE QoS parameters, relay QoS parameters, user application QoS, parameters, URI QoS parameters, relay HWT authentication, UE HWT authentication, D2D UE pairings, emergency response initiation, or some other service data. DLT nodes 131-133 transfer the service instructions to wireless data relays 111-113 over access data networks 121-123. DLT nodes 131-133 comprise computer equipment like processing circuitry, memory circuitry, bus circuitry, transceivers, and software. The processing circuitry executes operating systems and DLT software that are stored in the memory circuitry. The DLT software comprises applications for peer endorsement, transaction ordering, transaction commitment, node security, chain code, output data transmission, DLT databases, and the like. DLT nodes 131-133 are interconnected by various data communication networks.

Consider an emergency example where UE 107 transfers an emergency attachment message to wireless data relay 113. In response, wireless data relay 113 transfers a UE identity and location to DLT node 133 over access data network 123. DLT nodes 131-133 execute a DLT transaction with the emergency information and return emergency service instructions to wireless data relay 113. Wireless data relay 113 implements the emergency service instructions. For example, a service instruction may direct wireless data relay 113 to establish a high-quality video call between UE 107 and a medical response center. Another service instruction may direct wireless data relay 113 to transfer a user medical history to UE 107 for presentation to first responders.

Consider a D2D example where UE 103 attaches to wireless data relay 111, and UE 104 attaches to wireless data relay 112. Wireless data relays 111-112 transfer UE identities and locations to DLT node 132-133 over access data networks 122-123. DLT nodes 131-133 execute a DLT transaction with the D2D information and return D2D service instructions to wireless data relays 112-113. Wireless data relays 112-113 implement the service instruction. For example, the service instruction may direct wireless data relays 112-113 to schedule resources for a high-quality D2D data session between UEs 112-113.

Consider a voice or video calling example where UE 105 attaches to wireless data relay 112. Wireless data relay 112 transfers a UE identity, relay identity, and relay voice/video loading to DLT node 132 over access data network 122. DLT nodes 131-133 execute a transaction with the relay load and return a voice/video calling QoS instruction to wireless data relay 112. Wireless data relay 112 implements the voice/video calling QoS for UE 105. For example, the QoS may only allow best-effort for non-emergency calls that are placed when wireless data relay 112 is heavily loaded. Alternatively, the QoS may enable a guaranteed high-throughput link when wireless data relay 112 is lightly loaded.

Consider another example where UE 102 attaches to wireless data relay 111 and indicates a Uniform Resource Indicator (URI) or is pre-associated with the URI. In response, wireless data relay 111 transfers the URI for UE 102 to DLT node 131 over access data network 121. DLT nodes 131-133 execute a DLT transaction with the URI and return a URI QoS instruction to wireless data relay 112. Wireless data relay 112 implements the URI QoS for UE 102 when the URI is used. For example, the URI QoS may only allow emergency access over the URI. Alternatively, the QoS may allow several enhanced entertainment services to be delivered over the URI through wireless data relay 111.

Consider an HWT example where wireless data relay 111 and DLT node 131 obtain, exchange, and validate HWT digital certificates. UE 101 attaches to wireless data relay 111, and in response, wireless data relay 111 transfers the HWT digital certificates for wireless data relay 111 and for DLT node 131 to UE 101. UE 101 may refuse wireless data services if the HWT digital certificates for wireless data relay 111 and for DLT node 131 are not legitimate.

Consider another HWT example where UE 101 attaches to wireless data relay 111, and wireless data relay 111 enables the exchange of HWT data (random number and hash result) between UE 101 and an HWT server to obtain an HWT digital certificate for UE 101. Wireless data relay 111 transfers the HWT digital certificate for UE 101 to DLT node 131. DLT node 131 may refuse wireless data service to UE 101 if the HWT digital certificate for UE 101 is not legitimate.

Advantageously, wireless communication system 100 effectively and efficiently controls wireless data services with DLT nodes 131-133. Moreover, DLT nodes 131-133 control wireless data relays 111-113 that deliver the wireless data services to UEs 101-109.

Figure 2:
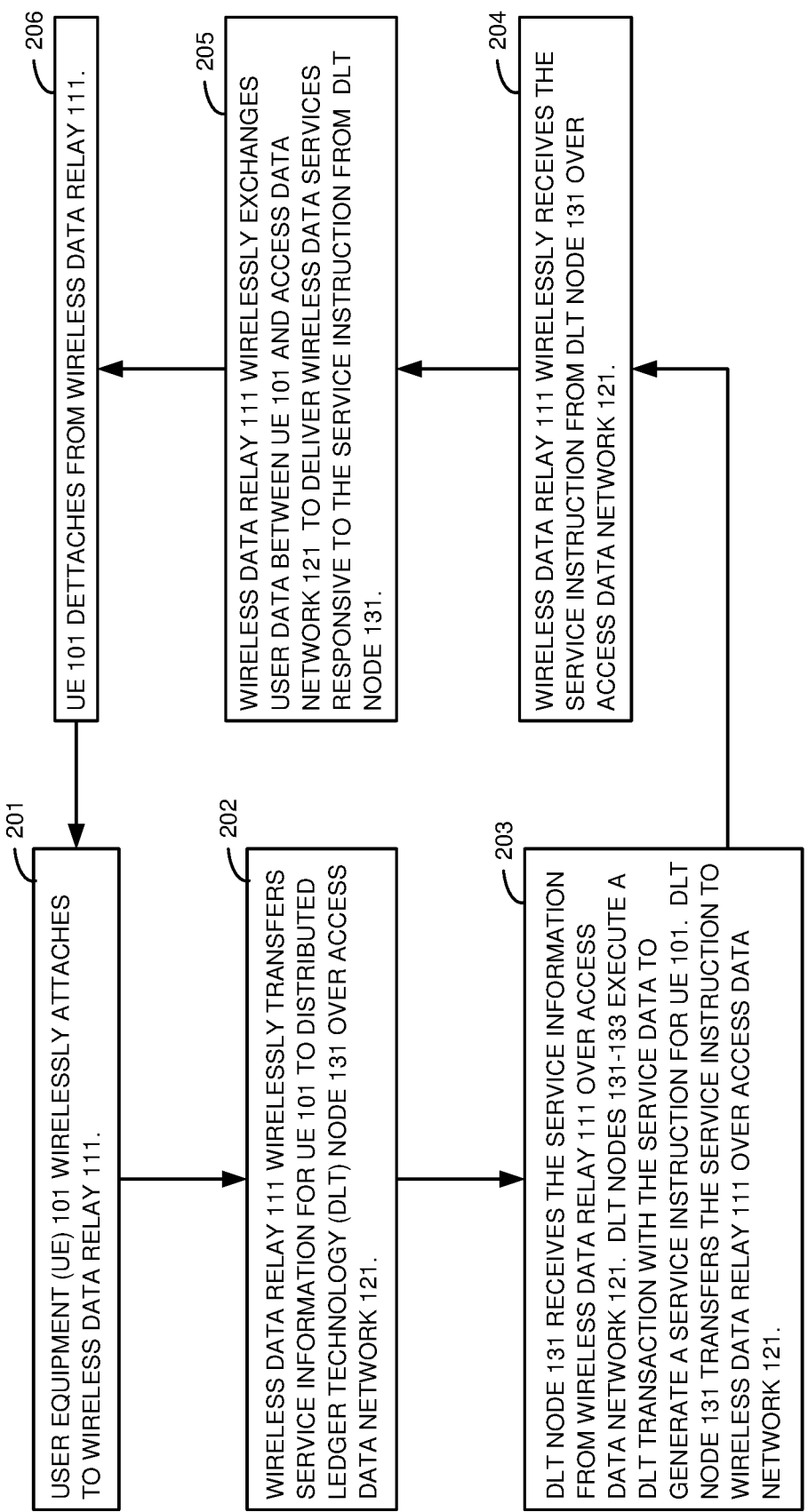
FIG. 2 illustrates the operation of the wireless communication system that uses the DLT nodes to control the wireless data relays that serve the wireless data services to the UEs.

FIG. 2 illustrates the operation of wireless communication system 100 that uses DLT nodes 131-133 to control wireless data relay 111 which serves the wireless data services to UE 101. UE 101 wirelessly attaches to wireless data relay 111 over LTE, WIFI, 5GNR, or some other wireless communication protocol (201). In response to the UE attachment, wireless data relay 111 wirelessly transfers service information for UE 101 to DLT node 131 over access data network 121 (202). The service information may comprise: user identity codes, UE identity codes, URIs, user application identifiers, relay HWT digital certificates, UE HWT digital certificates, relay voice service loading, relay video service loading, D2D data, emergency information, and/or some other data.

DLT node 131 receives the service information from wireless data relay 111 over access data network 121 (203). DLT nodes 131-133 execute a DLT transaction with the service data to generate a service instruction. The DLT transaction comprises peer endorsement, transaction ordering, transaction commitment, and transaction output. The service instruction may comprise: UE QoS, relay QoS, user application QoS, URI QoS, relay HWT authentication, UE HWT authentication, UE D2D pairings, emergency response initiation, or some other service data. DLT node 131 transfers the service instruction to wireless data relay 111 over access data network 121.

Wireless data relay 111 wirelessly receives the service instruction from DLT node 131 over access data network 121 (204). In response, wireless data relay 111 wirelessly exchanges user data between UE 101 and access data network 121 to deliver the wireless data services responsive to the service instruction from DLT node 131 (205). Wireless data relay 111 may deliver UE QoS, obtain network QoS, establish HWT with UEs and access networks, control wireless UE D2D communications, handle emergency communications, or perform some other networking tasks. Eventually, UE 101 wirelessly detaches form wireless data relay 111 (206). The operation repeats when UE 101 re-attaches to wireless relay 111 (201).

Figure 3:
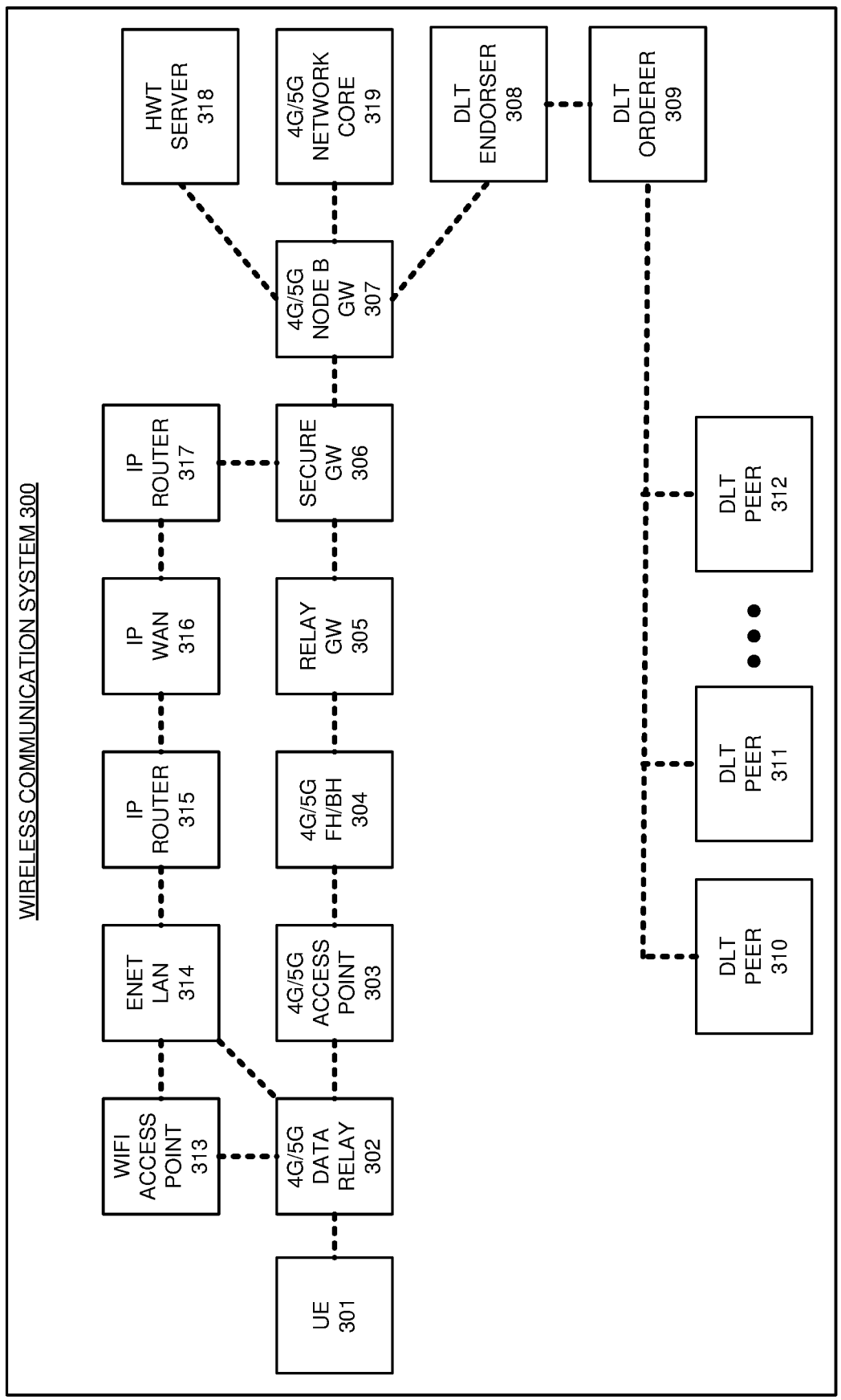
FIG. 3 illustrates a wireless communication system that uses DLT nodes to control a wireless data relay that serves wireless data services to a UE.

FIG. 3 illustrates wireless communication system 300 that uses DLT nodes 308-312 to control wireless data relay 302 that serves wireless data services to UE 301. Wireless communication system 300 is an example of wireless communication system 100 although system 100 could differ. Wireless communication system 300 comprises UE 301, Fourth Generation/Fifth Generation (4G/5G) data relay 302, 4G/5G access point 303, 4G/5G Fronthaul/Backhaul (FH/BH) circuitry 304, Relay Gateway (GW) 305, Secure GW 306, 4G/5G NodeB GW 307, DLT endorser 308, DLT orderer 309, DLT peers 310-312, WIFI access point 313, Ethernet (ENET) Local Area Network (LAN) 314, IP router 315, IP Wide Area Network (WAN) 316, IP router 317, Hardware Trust (HWT) server 318, and 4G/5G network core 319.

4G/5G network core 319 comprises network elements that drive the exchange of data and signaling between various systems and UE 301. The network elements comprise: User Plane Function (UPF), Access and Mobility Management Function (AMF), Session Management Function (SMF), Authentication Server Function (AUSF), Policy Control Function (PCF), Unified Data Management (UDM), Application Function (AF), Network Repository Function (NRF), Network Slice Selection Function (NSSF), Network Exposure Function (NEF), Mobility Management Entity (MME), Home Subscriber System (HSS), Serving Gateway (S-GW), Packet Data Network Gateway (P-GW), Policy Control Rules Function (PCRF), Call State Control Functions (CSCFs), and typically other network functions.

The UPF routes data packets and forms an anchor point for user nobility. The UPF inspects packets and applies Quality-of-Service. The AMF manages authentication, authorization, connections, mobility, N1 signaling, ciphering, registration, and security. The SMF manages session establishment, modification, and release. The SMF handles network addressing, Dynamic Host Control Protocol (DHCP) N1 signaling, downlink notification, and traffic steering. The AUSF authenticates and authorizes users. The UDM generates user authentication credentials and supports user identification, authorization, and subscriptions. The PCF provides policy rules and decisions. The AF routes traffic and implements policy controls. The NRF enables service discovery and maintain network function profiles/instances. The NSSF selects network slices to serve users and determine slice assistance information and AMFs. The NEF exposes capabilities and events. The NEF securely interacts with external applications and translates internal/external information.

The MME manages session establishment, modification, and release. The MME also manages authentication, authorization, mobility, Non-Access Stratum signaling, ciphering, registration, and security. The HSS authenticates and authorizes users and indicates user services. The HSS also generates user authentication credentials aid supports user identification and authorization. The S-GW serves wireless access points, routes data packets, and applies QoS. The P-GW routes data packets, handles network addressing, DHCP, forms anchor points for user mobility, inspects packets, and applies QoS. The PCRF provides policy rules and decisions. The CSCFs comprise Session Initiation Protocol (SP) servers that register UEs and control user media sessions by distributing IP addresses between UEs.

Initially, 4G/5G data relay 302 wirelessly attaches to 4G/5G access point 303. In response to the relay attachment, 4G/5G access point 303 and 4G/5G network core 319 exchange network signaling to establish a relay bearer between 4G/5G data relay 302 and 4G/5G network core 319 over 4G/5G access point 303, 4G/5G FH/BH circuitry 304, Relay GW 305, Secure GW 306, and 4G/5G NodeB GW 307. 4G/5G data relay 302 also attaches to WIFI access point 313 and/or Ethernet LAN 314. 4G/5G data relay 302 and 4G/5G Secure GW 306 exchange signaling to establish another relay bearer between 4G/5G data relay 302 and 4G/5G network core 319 over WIFI access point 313 and/or ENET LAN 314, IP router 315, IP WAN 316, IP router 317, Secure GW 306, and 4G/5G NodeB GW 307.

4G/5G data relay 302 and HWT server 318 exchange HWT information to establish HWT for relay 302. For example, HWT server 318 transfers a random number to relay 302, and relay 302 hashes the random number with an internal read-only HWT identity code to generate an HWT result. Relay 302 returns the HWT result to HWT server 318. HWT server 318 generates the same result with the random number and its own copy of the HWT identity for 4G/5G data relay 302. If the HWT results match, then HWT server 318 signs and transfers an HWT digital certificate to 4G/5G data relay 302. The HWT digital certificate has a time-to-live, and the HWT process is repeated to maintain HWT and issue new HWT digital certificates. Using a public key for HWT server 318, other systems can decode and validate the HWT digital certificate for 4G/5G relay 302. Likewise, DLT endorser 308 and HWT server 318 may exchange HWT information to establish and maintain HWT for DLT endorser 308 and deliver HWT digital certificates to DLT endorser 308.

4G/5G data relay 302 and DLT Endorser 308 exchange HWT digital certificates and DLT signaling to establish a relay control link between 4G/5G data relay 302 and DLT endorser 308 over multiple data paths (WIFI access point 313, Ethernet LAN 314, IP router 315, IP WAN 316, IP router 317, Secure GW 306, 4G/5G NodeB GW 307, 4G/5G access point 303, 4G/5G FH/BH 304, relay GW 305, Secure GW 306, 4G/5G NodeB GW 307). 4G/5G data relay 302 and DLT Endorser 308 will not use the relay control link if proper HWT digital certificates are not presented from the other end.

UE 301 wirelessly attaches to wireless data relay 302 over LTE, WIFI, or 5GNR. In response to the UE attachment, wireless data relay 302 wirelessly transfers service information to DLT endorser 308. The service information indicates user identity, UE identity, URI, user application identity, UE location, voice service load, video service load, and/or some other data. In response to the service information from 4G/5G data relay 302, DLT endorser 308 executes a test DLT transaction with the service data to generate a test service instruction. If the test result complies with pre-stored endorsement rules, then DLT endorser 308 transfers the endorsed transaction to DLT orderer 309 for peer distribution per a distribution list. Typically, additional endorser nodes will also perform the test transaction and all of the endorser nodes will reach a consensus on the test transaction before endorsing the transaction to DLT orderer 309.

DLT orderer 309 distributes the endorsed transaction to DLT peers 310-312—and both DLT endorser 308 and DLT orderer 309 typically operate as DLT peers to execute the endorsed transaction. In response to the transaction endorsement, DLT nodes 308-312 execute their chain code to process the service information to generate the service instruction. DLT nodes 308-312 reach a consensus on the service information and service instruction before committing the transaction data to DLT databases in a distributed blockchain format. The distributed blockchain format includes a hash of the previous data block in the subsequent data block across all DLT nodes to store immutable data. The service instruction indicates QoS like an excellent video uplink for a specific interactive gaming application. DLT endorser 308 transfers the service instruction to 4G/5G data relay 302.

4G/5G data relay 302 receives the service instruction from DLT endorser 308. 4G/5G data relay 302 wirelessly exchanges user data between UE 301 and 4G/5G network core 319 to deliver the wireless data services responsive to the service instruction from DLT endorser 308. Thus, 4G/5G data relay 302 delivers excellent QoS for the interactive gaming application in UE 301. 4G/5G relay 302 reports the service delivery to 4G/5G network core 319 to support network load balancing and control. 4G/5G data relay 302 also reports the service delivery to DLT endorser 308 which endorses and executes another DLT transaction based on the service delivery report.

UE 301 and HWT server 318 may exchange HWT information as described above to establish HWT for UE 301 and obtain HWT digital certificates for UE 301. UE 301 may transfer the UE HWT digital certificate to 4G/5G data relay 302, and 4G/5G data relay 302 transfers the UE HWT digital certificate to DLT endorser 308 as part of the service information. DLT endorser 308 may reject the service information if the UE digital certificate is invalid. Alternatively, DLT endorser 308 may select a different service or QoS for UEs that do not present valid HWT digital certificates.

Figure 4:
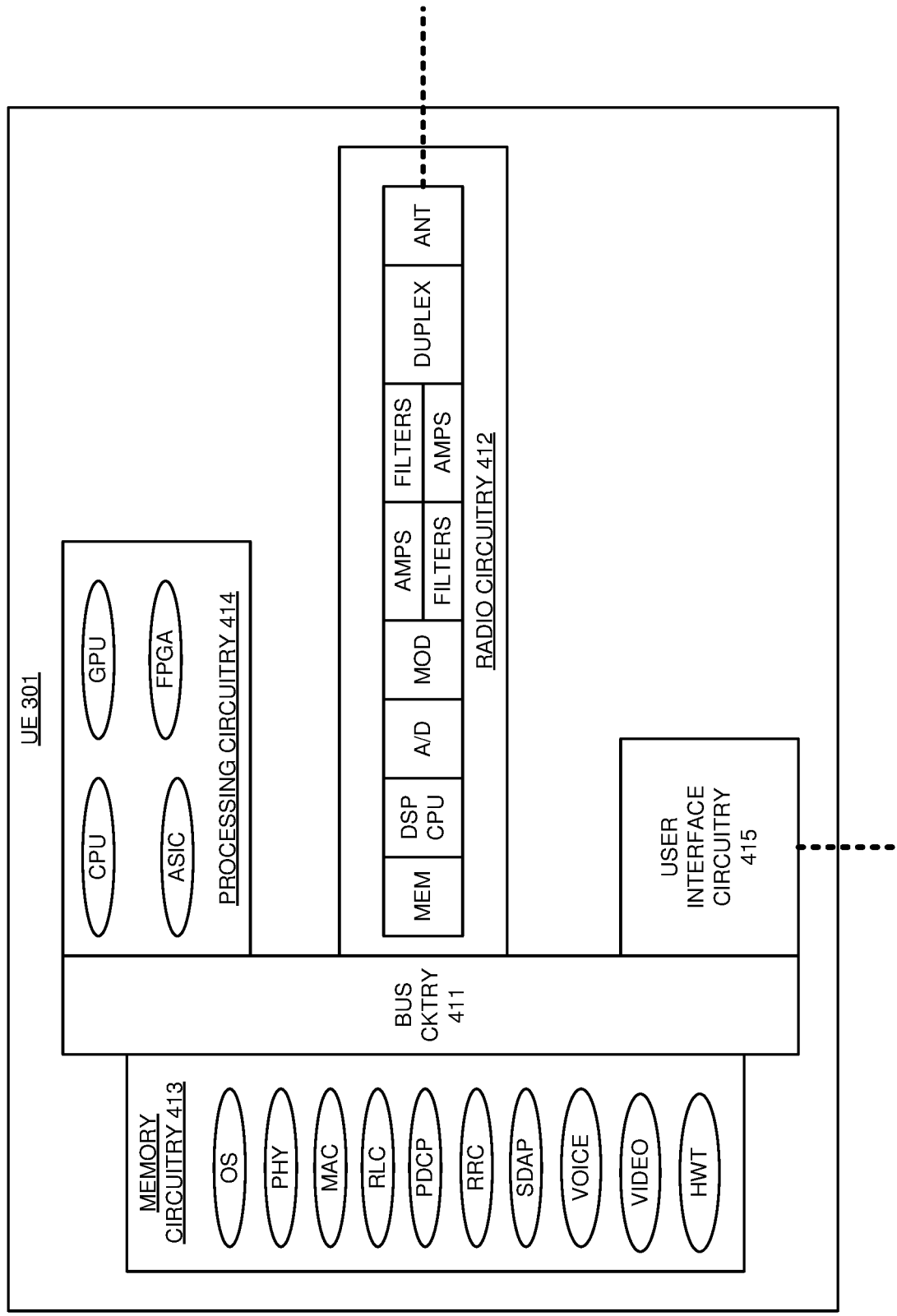
FIG. 4 illustrates the UE that receives the wireless data services from the wireless data relay under the control of the DLT nodes.

FIG. 4 illustrates UE 301 that receives the wireless data services from 4G/5G data relay 302 under the control of DLT nodes 308-312. UE 301 comprises bus circuitry 411, radio circuitry 412, memory circuitry 413, processing circuitry 414, and user interface circuitry 415. Bus circuitry 411 couples radio circuitry 412, memory circuitry 413, processing circuitry 414, and user interface circuitry 415. Memory circuitry 413 comprises volatile and non-volatile memories like flash, disc, tape, and the like. Memory circuitry 413 stores operating systems, network applications, user applications, and the shared secret key. Processing circuitry 414 comprises CPUs, GPUs, ASICs, FPGAs and/or some other computer hardware. Processing circuitry 414 executes the operating systems, network applications, and user applications to drive radio circuitry 412 and user interface circuitry 415. User interface circuitry 415 comprises displays, speakers, microphones, transceivers, ports, and/or some other user component.

Radio circuitry 412 comprises antennas (ANT), duplexers (DUPLEX), filters, amplifiers (AMPS), modulators (MOD), analog/digital interfaces (A/D), Digital Signal Processors (DSP), Central Processing Units (CPU), and memory (MEM). The antennas in radio circuitry 412 exchange wireless data and signaling with LTE/5GNR data relay 302. The DSP/CPUs execute firmware/software to drive the exchange of the data and signaling between the antennas and the radio memory. Processing circuitry 414 executes the operating systems and network applications to drive the exchange of data and signaling between the radio memory and memory circuitry 413.

The voice and video applications generate voice/video data and signaling—typically by user interface circuitry 415 sensing voice/video data. The network applications process the application data and signaling to generate and store UL data and signaling in the radio memory. In radio circuitry 412, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to 4G/5G data relay 302.

In radio circuitry 412, the antennas receive wireless Downlink (DL) signals from 4G/5G data relay 302 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 413. The network applications process the DL data and signaling in memory circuitry 413 to generate voice/video data and application signaling. The voice and video applications process the voice/video data and application signaling —typically by user interface circuitry 415 presenting the voice/video data.

The network applications comprise Physical Layer (PHY), Media Access Control (MAC), Radio Link Control (RLC), Packet Data Convergence Protocol (PDCP), Radio Resource Control (RRC), Service Data Application Protocol (SDAP), and the like. The PHY maps between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The MAC maps between the MAC transport channels and MAC logical channels. MAC functions include buffer status, power headroom, channel quality, Hybrid Automatic Repeat Request (HARQ), user identification, random access, user scheduling, and QoS. The RLC maps between the MAC logical channels and Protocol Data Units (PDUs). RLC functions comprise ARQ, sequence numbering and resequencing, segmentation and resegmentation. The RLC exchanges data and signaling with the PDCP. The PDCP maps between the PDUs from the RLC and Service Data Units (SDUs) for the RRC/SDAP. PDCP functions comprise security ciphering, header compression and decompression, sequence numbering and re-sequencing, de-duplication. The PDCP exchange SDUs with the RRC and SDAP.

The RRC transfers UE information like IMSI, IMEI, IMPU, and/or IMPI during RRC attachment. The RRC receives and processes a random number and the secret key to generate and return an authentication result for LTE network authentication. The voice/video applications and the RRC also exchange the UE information like IMSI, IMEI, IMP, and/or IMPI. The RRC interacts with wireless network controllers like Access and Mobility Functions (AMFs) and/or Mobility Management Entities (MMEs) to establish and terminate data sessions. The RRC supports N1 and Non-Access Stratum (NAS) messaging with the MMEs/AMFs. The RRC handles security and key management, handover operations, status reporting, QoS, system broadcasts, and network pages. The SDAP exchanges S3 data with User Plane Functions (UPFs) under the control of Session Management Functions (SMFs). The SDAP maps between the SDUs and the QoS flows and mark the QoS flows with the proper QoS.

Figure 5:
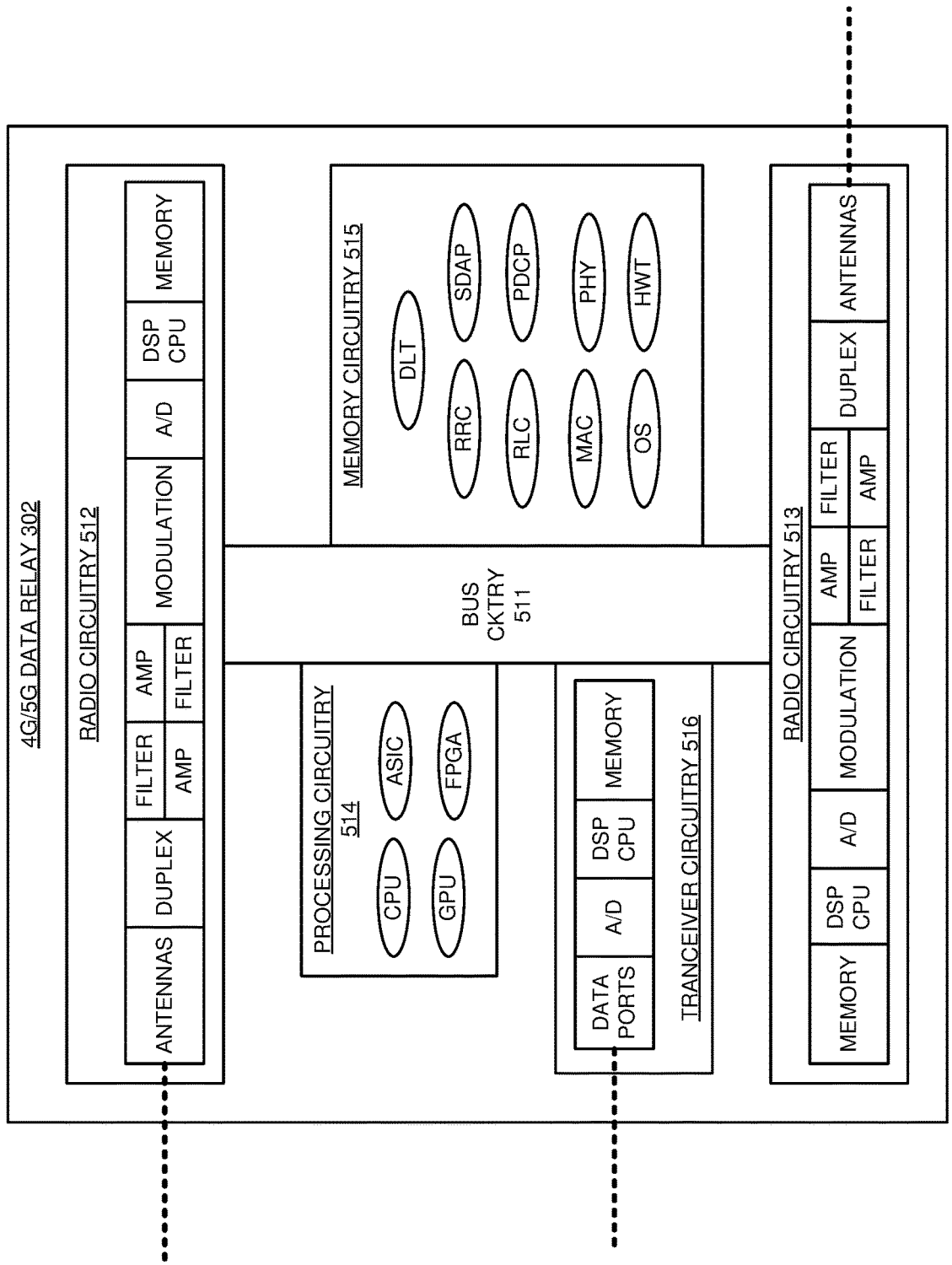
FIG. 5 illustrates the wireless data relay that serves the wireless data services to the UE under the control of the DLT nodes.

FIG. 5 illustrates 4G/5G data relay 302 that serves the wireless data services to UE 301 under the control of DLT nodes 308-312. 4G/5G data relay 302 comprises bus circuitry 511, radio circuitry 512-513, processing circuitry 514, memory circuitry 515, and transceiver circuitry 516. Bus circuitry 511 couples radio circuitry 512-513, processing circuitry 514, memory circuitry 515, and transceiver circuitry 516. Memory circuitry 515 comprises volatile and non-volatile memories like flash, disc, tape, and the like. Memory circuitry 515 stores an operating system (OS), network applications (PHY, MAC, RLC, PDCP, RRC, SDAP, HWT, DLT), and the like. Processing circuitry 514 comprises CPUs, GPUs, ASICs, FPGAs, or some other computer hardware. Transceiver circuitry 516 comprises memory, DSP/CPU, analog-to-digital interface, and data ports. The data ports in transceiver circuitry 516 could be wireless and communicate with WIFI access point 313 and/or the data ports could be wireline and communicate with Ethernet LAN 314.

Radio circuitry 512-513 each comprise antennas, duplexers, filters, amplifiers, modulation, analog/digital interfaces, DSP/CPUs, and memory. In radio circuitry 512, the antennas exchange wireless signals with wireless UE 301, and the DSP/CPUs execute firmware/software to drive the exchange of data between the antennas and memory circuitry 515. Processing circuitry 514 executes the operating system and network applications to drive the exchange of the data between radio circuitry 512-513 through memory circuitry 515. In radio circuitry 513, the antennas exchange wireless signals with 4G/5G access point 303, and the DSP/CPUs execute firmware/software to drive the exchange of data between the antennas and memory circuitry 515.

The antennas in radio circuitry 512 receive wireless UL signals from UE 301 and transfer corresponding electrical UL signals through the duplexers to the amplifiers. The amplifiers boost the UL signals for filters which attenuate unwanted energy. In modulation, demodulators down-convert the UL signals from their carrier frequencies. The analog/digital interfaces convert the analog UL signals into digital UL signals for the DSP/CPUs. The DSP/CPUs recover UL data and signaling from the UL signals. The DSP/CPUs store the UL data and signaling in memory circuitry 515. The network applications process the UL data and signaling in memory circuitry 515. In some examples, the network applications transfer the UL data and signaling from memory circuitry 515 to 4G/5G access point 303. In other examples, the network applications transfer the UL data and signaling from memory circuitry 515 to WIFI access point 313 and/or Ethernet LAN 314.

For 4G/5G access point 303, the network applications generate and store UL data and signaling in the radio memory of radio circuitry 513. In radio circuitry 513, the DSP/CPUs process the UL data and signaling and transfer corresponding UL signals to the analog/digital interface. The analog/digital interface converts the digital UL signals into analog UL signals for the modulators. The modulators up-convert the UL signals to their carrier frequencies. The amplifiers boost the UL signals for the filters which attenuate unwanted out-of-band energy. The filters transfer the UL signals through the duplexers to the antennas. The electrical UL signals drive the antennas to emit corresponding wireless UL signals to 4G/5G access point 303.

In radio circuitry 513, the antennas receive wireless Downlink (DL) signals from 4G/5G access point 303 and transfer corresponding electrical DL signals through the duplexers to the amplifiers. The amplifiers boost the DL signals for filters which attenuate unwanted energy. In modulation, demodulators down-convert the DL signals from their carrier frequencies. The analog/digital interfaces convert the analog DL signals into digital DL signals for the DSP/CPUs. The DSP/CPUs recover DL data and signaling from the DL signals. The DSP/CPUs transfer the DL data and signaling to memory circuitry 515. The network applications transfer the DL data and signaling from memory circuitry 515 to radio circuitry 512. In radio circuitry 512, the DSP/CPUs transfer corresponding DL signals to the analog/digital interface. The analog/digital interface converts the digital DL signals into analog DL signals for the modulators. The modulators up-convert the DL signals to their carrier frequencies. The amplifiers boost the DL signals for the filters which attenuate unwanted out-of-band energy. The filters transfer the DL signals through the duplexers to the antennas. The electrical DL signals drive the antennas to emit corresponding wireless DL signals to UE 301.

In 4G/5G data relay 302, the PHYs map between the MAC transport channels and PHY transport channels. The PHY functions comprise packet formation/deformation, windowing/de-windowing, guard-insertion/guard-deletion, parsing/de-parsing, control insertion/removal, interleaving/de-interleaving, FEC encoding/decoding, rate matching/de-matching, scrambling/descrambling, modulation mapping/de-mapping, channel estimation/equalization, FFTs/IFFTs, channel coding/decoding, layer mapping/de-mapping, pre-coding, DFTs/IDFTs, and RE mapping/de-mapping.

The MACs map between the MAC transport channels and MAC logical channels. MAC functions include buffer status, power headroom, channel quality, HARQ, user identification, random access, user scheduling, and QoS. The MACs implement the QoS as directed by the DLT nodes (through the RRCs).

The RLCs map between the MAC logical channels and PDUs. RLC functions comprise ARQ, sequence numbering and resequencing, segmentation and resegmentation. The RLCs exchange data and signaling with the PDCPs. The PDCPs map between the PDUs from the RLCs and SDUs for the RRCs/SDAPs. PDCP functions comprise security ciphering, header compression and decompression, sequence numbering and re-sequencing, de-duplication. The PDCPs exchange SDUs with the RRCs and SDAPs.

The RRCs interact with wireless network controllers like AMFs and/or MMEs to establish and terminate data sessions. The RRCs support N1/N2 messaging with the AMFs. The RRCs handle security and key management, handover operations, status reporting, QoS, system broadcasts, and network pages. The SDAPs exchange S3 data with UPFs under the control of SMFs. The SDAPs map between the SDUs and the QoS flows and mark the QoS flows with the proper QoS.

In particular, the RRCs interact with the DLT application to transfer service information to DLT endorser 308 and to receive service instructions for UE 301 from DLT endorser 308. In 4G/5G data relay 302, the RRCs, SDAPs, and MACs implement the service instructions from DLT endorser 308 for UE 301. For example, the MACs and SDAPs may deliver superior UL data throughput for a medical imaging application in UE 301.

Figure 6:
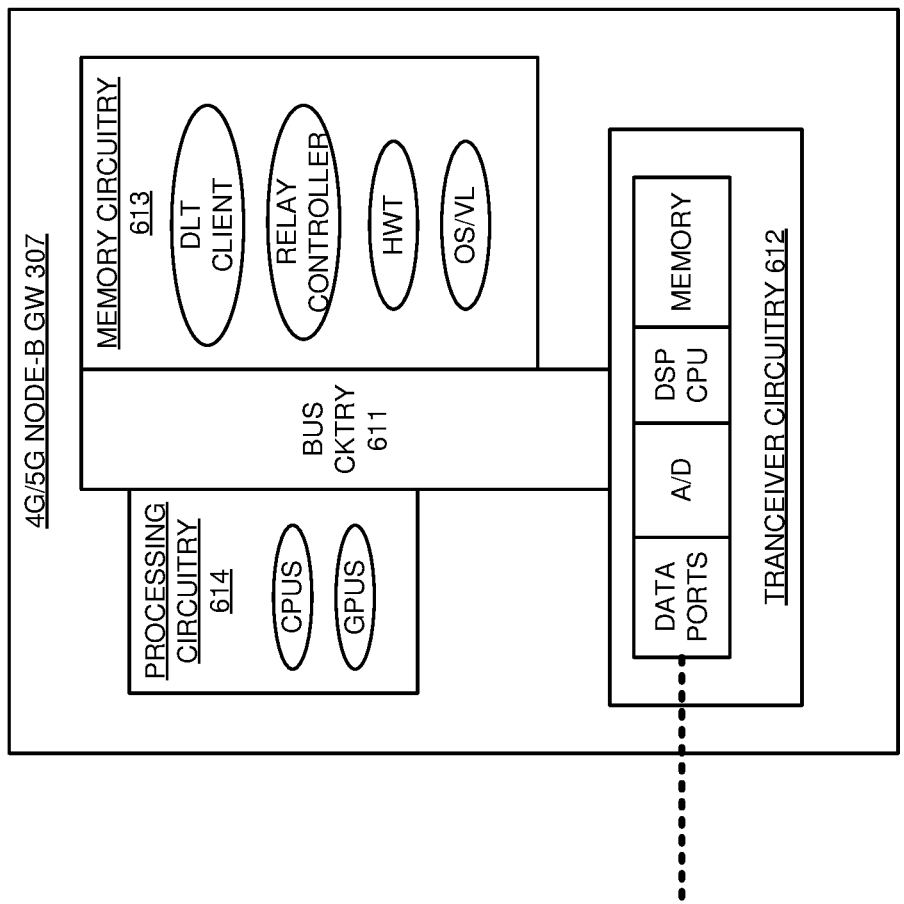
FIG. 6 illustrates a gNodeB Gateway (GW) that interfaces the wireless data relay and the DLT nodes.

FIG. 6 illustrates 4G/5G NodeB Gateway (GW) 307 that interfaces wireless data relay 302 and DLT nodes 308-312. 4G/5G NodeB GW 307 comprises bus circuitry 611, transceiver circuitry 612, memory circuitry 613, and processing circuitry 614. Bus circuitry 611 couples transceiver circuitry 612, memory circuitry 613, and processing circuitry 614. Memory circuitry 613 comprises volatile and non-volatile memories like flash, disc, tape, and the like. Memory circuitry 613 stores operating systems (OS), virtual layers (VL), and network applications like HWT, relay controller, and DLT client. Processing circuitry 614 comprises CPUs, GPUs, and/or some other computer hardware that executes the operating system and network applications. Transceiver circuitry 612 comprises memory, DSP, CPU, analog-to-digital interface, and data ports. The data ports in transceiver circuitry 612 communicate with Secure GW 306, HWT server 318, 4G/5G network core 319, and DLT endorser 308.

Processing circuitry 614 executes the operating systems to drive the hardware and support the virtual layers. Processing circuitry 614 executes the virtual layers to support the network applications. The virtual layers comprise virtual switches, virtual machines, hypervisors, and the like. In transceiver circuitry 612, the DSP/CPUs exchange data and signaling with the transceiver memory. Processing circuitry 614 exchanges the data and signaling between the transceiver memory and memory circuitry 613. Processing circuitry 614 executes the network applications to process the data and signaling in memory circuitry 613.

In particular, the relay controller application supports relay registration, configuration, provisioning, and reporting. The relay controller application interfaces with the HWT application and the DLT client application. The HWT application maintains HWT with HWT server 318 and distributes HWT digital certificates as needed. The HWT application also validates HWT digital certificates for other systems by using a public key for HWT server 318. The DLT client application establishes a control link to DLT endorser 308 and may establish HWT with endorser 308. The DLT client interacts with the RRCs in 4G/5G data relay 302 to obtain service information and deliver service instructions for UE 301. The DLT client interacts with DLT endorser node 308 to deliver the service information and obtain the service instructions for UE 301.

Figure 7:
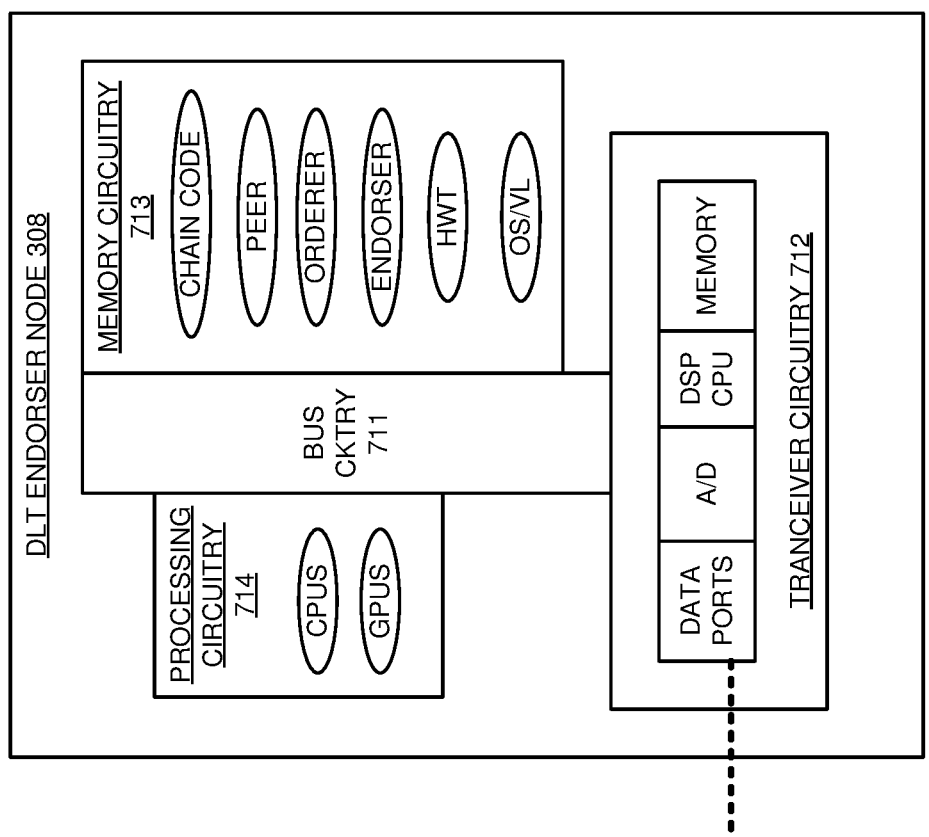
FIG. 7 illustrates a DLT node that controls the wireless data relay to serve the wireless data services to the UE.

FIG. 7 illustrates DLT endorser node 308 that controls wireless data relay 302 to serve the wireless data services to UE 301. DLT endorser node 308 comprises bus circuitry 711, transceiver circuitry 712, memory circuitry 713, and processing circuitry 714. Bus circuitry 711 couples transceiver circuitry 712, memory circuitry 713, and processing circuitry 714. Memory circuitry 713 comprises volatile and non-volatile memories like flash, disc, tape, and the like. Memory circuitry 713 stores operating systems, virtual layers, and DLT applications like HWT, endorser, orderer, peer, and chain code. Processing circuitry 714 comprises CPUs, GPUs, and/or some other computer hardware that executes the operating system and network applications. Transceiver circuitry 712 comprises memory, DSP, CPU, analog-to-digital interface, and data ports. The data ports in transceiver circuitry 712 communicate with 4G/5G NodeB GW 307 and DLT nodes 309-312.

Processing circuitry 714 executes the operating system to drive the hardware and support the virtual layers. Processing circuitry 714 executes the virtual layers to support the DLT applications. The virtual layers comprise virtual switches, virtual machines, hypervisors, and the like. In transceiver circuitry 712, the DSP/CPUs exchange service information and instructions with the transceiver memory. Processing circuitry 714 exchanges the service information and instructions between the transceiver memory and memory circuitry 713. Processing circuitry 714 executes the DLT applications to process the service information in memory circuitry 713 to generate the service information that is stored in memory circuitry 713.

In particular, the HWT application maintains HWT with HWT server 318 and distributes HWT digital certificates as needed. The HWT application also validates HWT digital certificates for other systems by using a public key for HWT server 318. The endorser application serves DLT clients and endorses proposed DLT transactions based on endorsement rules. The orderer application serves DLT endorsers and distributes endorsed DLT transactions to peer nodes based on orderer rules. The peer application serves DLT orderers and executes the chain code for endorsed DLT transactions to form a consensus on DLT outputs. The peer application commits endorsed and executed DLT transactions to block chain databases responsive to peer consensus. The endorser application also transfers DLT outputs to the DLT clients per the endorser rules.

When UE 301 attaches to 4G/5G data relay 302, the RRCs and DLT application in relay 302 transfer service information for UE 301 to the DLT client in 4G/5G NodeB GW 307. The DLT client in 4G/5G NodeB GW 307 transfers the service information for UE 301 to the DLT endorser application in DLT endorser 308. DLT endorser 308 endorses the proposed DLT transaction based on HWT status, the service information, and the endorsement rules. The orderer application distributes the endorsed DLT transaction to DLT peers based on orderer rules. The peer applications each execute their chain code and form a consensus and commit the DLT transaction to a block chain database—including the generation of service instructions for UE 301. The endorser application transfers the service instructions for UE 301 to the DLT client in 4G/5G NodeB GW 307. The DLT client in 4G/5G NodeB GW 307 transfers the service instruction for UE 301 to the DLT application and RRCs in 4G/5G relay 302. 4G/5G relay 302 implements the service instruction for UE 301. For example, UE 301 may receive a high QoS from 4G/5G data relay 302 based on the UE ID and user application.

The wireless data network circuitry described above comprises computer hardware and software that form special-purpose network elements that serve users with more efficient wireless relay services using DLT. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network elements that serve users with more efficient wireless relay services using DLT.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system that serves wireless data services to User Equipment (UEs), the method comprising:
    wireless data relays wirelessly transferring service information over access data networks to Distributed Ledger Technology (DLT) nodes and responsively receiving service instructions over the access data networks from the DLT nodes;
    the DLT nodes receiving the service information over the access data networks from the wireless data relays, executing DLT transactions with the service data to generate the service instructions, and transferring the service instructions over the access data networks to the wireless data relays, wherein executing the DLT transactions comprises executing the DLT transactions with user identity codes to generate individual Quality-of-Service (QoS) parameters for the UEs; and
    the wireless data relays wirelessly receiving the service instructions over the access data networks from the DLT nodes and wirelessly exchanging user data between the UEs and the access data networks to deliver the wireless data services responsive to the service instructions from the DLT nodes.

2. The method of claim 1 wherein the DLT nodes executing the DLT transactions with the service information to generate the service instructions comprises the DLT nodes executing the DLT transactions with UE identity codes to generate individual Quality-of-Service (QoS) parameters for the UEs.

3. The method of claim 1 wherein the DLT nodes executing the DLT transactions with the service information to generate the service instructions comprises the DLT nodes executing the DLT transactions with Uniform Resource Indicators (URIs) to generate individual Quality-of-Service (QoS) parameters for the URIs.

4. The method of claim 1 wherein the DLT nodes executing the DLT transactions with the service information to generate the service instructions comprises the DLT nodes executing the DLT transactions with Hardware Trust (HWT) digital certificates from the wireless data relays to authenticate the wireless data relays.

5. The method of claim 1 wherein the DLT nodes executing the DLT transactions with the service information to generate the service instructions comprises the DLT nodes executing the DLT transactions with Hardware Trust (HWT) digital certificates from the UEs to authenticate the UEs.

6. The method of claim 1 wherein the DLT nodes executing the DLT transactions with the service information to generate the service instructions comprises the DLT nodes executing the DLT transactions with voice service loading on the wireless data relays to generate individual Quality-of-Service (QoS) parameters for the wireless data relays.

7. The method of claim 1 wherein the DLT nodes executing the DLT transactions with the service information to generate the service instructions comprises the DLT nodes executing the DLT transactions with video service loading on the wireless data relays to generate individual Quality-of-Service (QoS) parameters for the wireless data relays.

8. The method of claim 1 wherein the DLT nodes executing the DLT transactions with the service information to generate the service instructions comprises the DLT nodes executing the DLT transactions with UE information to generate Device-to-Device (D2D) UE pairings for wireless D2D communications.

9. The method of claim 1 wherein the DLT nodes executing the DLT transactions with the service information to generate the service instructions comprises the DLT nodes executing the DLT transactions with emergency information to initiate emergency responses for the UEs.

10. A wireless communication system that serves wireless data services to User Equipment (UEs), the wireless communication system comprising:
wireless data relays configured to wirelessly transfer service information over access data networks to Distributed Ledger Technology (DLT) nodes and responsively receive service instructions over the access data networks from the DLT nodes;
the DLT nodes configured to receive the service information over the access data networks from the wireless data relays, execute DLT transactions with the service data to generate the service instructions, and transfer the service instructions over the access data networks to the wireless data relays, wherein the service information comprises user identity codes and the service instructions comprise Quality-of-Service (QoS) parameters for the UEs and the DLT nodes are configured to execute the DLT transactions with the user identity codes to generate the individual QoS parameters for the UEs; and
the wireless data relays configured to wirelessly receive the service instructions over the access data networks from the DLT nodes and wirelessly exchange user data between the UEs and the access data networks to deliver the wireless data services responsive to the service instructions from the DLT nodes.

11. The wireless communication system of claim 10 wherein the service information comprises UE identity codes, the service instructions comprise Quality-of-Service (QoS) parameters for the UEs, and the DLT nodes are configured to execute the DLT transactions with the UE identity codes to generate the individual QoS parameters for the UEs.

12. The wireless communication system of claim 10 wherein the service information comprises Uniform Resource Indicators (URIs), the service instructions comprise Quality-of-Service (QoS) parameters for the UEs, and the DLT nodes are configured to execute the DLT transactions with the URIs to generate the individual QoS parameters for the UEs.

13. The wireless communication system of claim 10 wherein the service information comprises Hardware Trust (HWT) digital certificates for the wireless data relays and the DLT nodes are configured to execute the DLT transactions responsive to the HWT digital certificates for the wireless data relays.

14. The wireless communication system of claim 10 wherein the service information comprises Hardware Trust (HWT) digital certificates for the UEs and the DLT nodes are configured to execute the DLT transactions responsive to the HWT digital certificates for the UEs.

15. The wireless communication system of claim 10 wherein the service information comprises voice service loading for the wireless data relays, the service instructions comprise Quality-of-Service (QoS) parameters for the UEs, and the DLT nodes are configured to execute the DLT transactions with the voice service loading to generate the individual QoS parameters for the UEs.

16. The wireless communication system of claim 10 wherein the service information comprises video service loading for the wireless data relays, the service instructions comprise Quality-of-Service (QoS) parameters for the UEs, and the DLT nodes are configured to execute the DLT transactions with the video service loading to generate the individual QoS parameters for the UEs.

17. The wireless communication system of claim 10 wherein the service information comprises UE information, the service instructions comprise Device-to-Device (D2D) UE pairings for wireless D2D communications, and the DLT nodes are configured to execute the DLT transactions with the UE information to generate the D2D UE pairings.

18. The wireless communication system of claim 10 wherein the service information comprises emergency information, the service instructions comprise emergency responses, and the DLT nodes are configured to execute the DLT transactions with the emergency information to generate the emergency responses.

\* \* \* \* \*